(12) United States Patent
Tian et al.

(10) Patent No.: US 11,788,407 B2
(45) Date of Patent: Oct. 17, 2023

(54) DOWNHOLE SIGNAL RECEIVING AND TRANSMITTING DEVICE

(71) Applicants: Southwest Petroleum University, Chengdu (CN); Sichuan Xieming Technology Co., Ltd., Chengdu (CN)

(72) Inventors: Jialin Tian, Chengdu (CN); Changqing Xiong, Chengdu (CN); Lei Tang, Chengdu (CN); Haolin Song, Chengdu (CN); Lanhui Mao, Chengdu (CN); Lin Yang, Chengdu (CN)

(73) Assignees: Southwest Petroleum University, Chengdu (CN); Sichuan Xieming Technology Co, Ltd., Chengdu (CN)

( * ) Notice: Subject to any disclaimer, the term of this patent is extended or adjusted under 35 U.S.C. 154(b) by 213 days.

(21) Appl. No.: 17/345,213

(22) Filed: Jun. 11, 2021

(65) Prior Publication Data
US 2022/0364462 A1    Nov. 17, 2022

(30) Foreign Application Priority Data
May 14, 2021    (CN) .......................... 202110526408.2

(51) Int. Cl.
    *E21B 47/18*    (2012.01)
    *H01Q 1/04*    (2006.01)
    *H04B 1/38*    (2015.01)

(52) U.S. Cl.
    CPC ............... *E21B 47/18* (2013.01); *H01Q 1/04* (2013.01); *H04B 1/38* (2013.01)

(58) Field of Classification Search
CPC .............. E21B 47/18; H01Q 1/04; H04B 1/38
See application file for complete search history.

(56) References Cited

U.S. PATENT DOCUMENTS

| | | | | |
|---|---|---|---|---|
| 6,347,674 | B1* | 2/2002 | Bloom ................. | E21B 33/127 |
| | | | | 175/98 |
| 2002/0057210 | A1* | 5/2002 | Frey ...................... | E21B 47/017 |
| | | | | 340/854.3 |
| 2007/0251726 | A1* | 11/2007 | Menger ............... | E21B 17/1014 |
| | | | | 175/55 |

(Continued)

*Primary Examiner* — Amine Benlagsir
(74) *Attorney, Agent, or Firm* — Andrew D. Fortney; Central California IP Group, P.C.

(57) ABSTRACT

The disclosure relates to petroleum drilling, specifically a downhole signal receiving and transmitting device. The downhole signal receiving and transmitting device includes a receiving part, a control device, a mechanical assembly and a transmitting mechanism. The receiving part receives a signal transmitted by a lower end instrument, and the control device process the received signal, controls a motor to drive a rotating sleeve, and the mechanical assembly performs work. The mechanical assembly drives a mandrel to rotate a rotor continuously and regularly. When rotating, the flow area of the rotor and a stator changes to produce continuous pulses. The pressure waveform changes are monitored on the ground, and the measurement data are calculated by decoding. The device can obtain engineering parameters and geological parameters in the downhole drilling process in real time, which helps engineers to adjust the drilling trajectory and related parameters, and realize real-time measurement and control while drilling.

4 Claims, 6 Drawing Sheets

(56) References Cited

U.S. PATENT DOCUMENTS

| | | | |
|---|---|---|---|
| 2010/0089583 A1* | 4/2010 | Xu | E21B 47/13 175/57 |
| 2011/0017473 A1* | 1/2011 | Clarkson | E21B 7/062 166/380 |
| 2012/0132418 A1* | 5/2012 | McClung, III | E21B 47/13 166/250.12 |
| 2013/0206401 A1* | 8/2013 | Bhoite | E21B 34/066 166/250.01 |
| 2013/0319767 A1* | 12/2013 | Wilson | E21B 47/18 175/232 |
| 2015/0176344 A1* | 6/2015 | McLoughlin | E21B 17/1078 175/24 |
| 2015/0361766 A1* | 12/2015 | Downie | E21B 4/02 175/48 |
| 2016/0032710 A1* | 2/2016 | Hu | E21B 47/08 33/544.2 |
| 2016/0258282 A1* | 9/2016 | McClung, III | E21B 47/09 |
| 2018/0347319 A1* | 12/2018 | Feluch | E21B 47/26 |

\* cited by examiner

DOWNHOLE SIGNAL RECEIVING AND TRANSMITTING DEVICE

TECHNICAL FIELD

The invention belongs to the technical field of petroleum drilling, and particularly relates to a downhole signal receiving and transmitting device used for directional well.

BACKGROUND OF THE INVENTION

With the deepening of oil and gas resource development, drilling engineering is facing more complex work conditions, and the difficulties of exploitation are also increasing. In order to expand the downhole exploration area and enhance the production of the oil and gas resources, the accuracy is required in the drilling process. Therefore, the requirements of drilling engineering on the accuracy of trajectory control are also increasing, and the precise relative spatial position of the wellbore is more critical. In the traditional logging technologies, when the drilling is completed, a measuring instrument is placed in the well with a cable to detect the oil content or other formations. With the development of oil fields challenge, the drawbacks of this technology have become more and more obvious. The wireless MWD (measurement while drilling) device can avoid these limitations of current wired MWD.

These points, such as providing field trajectory parameters accurately, improving the control ability and calculation accuracy of wellbore trajectories, have become practical key techniques in construction of high-precision wells, especially in complex wells, directional wells, and long-distance horizontal wells. In order to make the drill head towards the "sweet spot" of the reservoir during the drilling process, it is necessary to use real-time transmission in MWD instruments. The real-time transmission device can capture engineering and geological parameters, which can satisfy the accuracy of adjusting the wellbore trajectory and drilling parameters by drilling technicians. For this reason, it is one of the important development directions of modern oil and gas drilling technology, which includes studying the downhole signal receiving and transmitting device for the accuracy of downhole directional drilling and improving the drilling efficiency. The downhole signal receiving and transmitting device receives the signal transmitted by the lower end instrument, completes the processing of this signal in the electronic warehouse, and controls the motor to make the rotor rotate continuously and regularly. When rotating, the flow area of the rotor and the stator changes to generate continuous pulses. The pressure waveform changes are monitored on the ground, and the measurement data is obtained through decoding and calculating to achieve the purpose of the well trajectory control.

SUMMARY OF THE INVENTION

The present invention aims to provide a downhole signal receiving and transmitting device for directional wells.

In order to solve the related problems of borehole trajectory and information transmission mentioned in the background technology, the invention provides a downhole signal receiving and launching device. It can reduce drilling cost and improve efficiency. When the device is working, the antenna of the receiving part receives the signal transmitted by the lower instrument. The electronic warehouse performs noise-reducing filter and code modulation on the signal, and then the warehouse controls the motor to drive the rotating sleeve so that the mandrel drives the rotor to rotate regularly. The number of rotor blades is as same as the number of stator voids, and the shape and size of rotor blades are the same as the stator voids, which can effectively block the passage of mud. As the rotor and stator flow area changes, the continuous pulse is generated. With the mud pulse signal generated by the device, the downhole engineering information and geological information can be obtained in real time to improve the drilling efficiency.

The technical scheme in the invention is: the downhole signal receiving and transmitting device is located in an outer sleeve, having ends respectively connectable to an upper drilling tool and a lower drilling tool by a detachable thread;

a receiving part that comprises a connection sleeve connected with a sealing device, a centralizer to ensure the vertical work of the instrument, a receiving antenna, an antenna sleeve and an antenna end cover limiting the movement of the receiving antenna, an antenna spindle, and a battery compartment for the power supply of the device, a battery shell, a conductor B, and a socket. The centralizer, antenna sleeve and connection sleeve are on the antenna spindle. The front end of the antenna spool is equipped with a sealing device. The antenna end cover is distributed on opposite sides or ends of the antenna sleeve. The rear end of the battery compartment may include the socket, both of which are in the battery housing together. The three parts are on the rear end of the spindle. The battery shell is connected to the control shell by a detachable thread (e.g., a screw fitting). The receiving part can receive the wireless signal transmitted by the lower instrument and supply power to the whole device.

The control device comprises a plug, a conductor A, an electronic warehouse, a motor, a control shell and a driving part; the electronic warehouse is fixed with the motor by a detachable thread and is connected to the plug via the conductor A. The front cylinder of the drive part is matched with the rear slot of the rotating sleeve, and the drive part, the motor, the electronic warehouse and the plug are in the control shell, which is at the rear end of the deceleration shell. The control device is configured to process the received signal, control the rotation of the motor, and drive the mechanical assembly.

The mechanical assembly comprises an outer magnet, a rotating sleeve, an inner magnet, a rotating part and a rotating spindle, a reducer box, a coupling, a coupling sleeve, an angular contact ball bearing to ensure that the mandrel can rotate independently and a deceleration shell to assemble the outer magnet, the rotating sleeve, the inner magnet, the rotating part and the rotating spindle, the reducer box, the coupling, the coupling sleeve, and the angular contact ball bearing. An inner magnet and a rotating part are on the rotating spindle, and then all of them are on the rear end of the reducer. The front of the rotating part is in an inner cavity of the inner magnet. The rotating sleeve is connected to the outer magnet by bolts and gaskets. The outer magnet is on the inner magnet and the rotating parts, and these parts are put into the deceleration shell to cooperate with the pulse shell. The mechanical assembly can reduce a speed of the motor and transmit the movement to the mandrel.

The transmitting mechanism comprises a pulse shell, a pulser, a balance piston in the mandrel and configured to achieve dynamic balance, a rotor, a stator, a retention pin and a front end; the rotor rotates with the mandrel and both of them are located in the pulse shell. The retention pin and the front end restrict an axial movement of the stator. The pulser is on the mandrel and matched with the rear end of the pulse shell by bolts. The transmitting mechanism generates a continuous pulse signal due to the change in a flow area of the rotor and stator, and emits measured information.

In some embodiments, the pulser has a circumference and four bolt holes evenly distributed at 90° angles on the circumference, the pulser is connected to the pulse shell by bolts. The mechanical assembly comprises a U-shaped groove between two of the four bolt holes. When material removed by the drill (e.g., mud) passes in or through the U-shaped groove, the drilling fluid enters a cavity between the pulse shell and the rotor. The rotor includes a key that limits a rotation range of the rotor to 90°.

In some embodiments, the angular contact ball bearing, the coupling, and the coupling sleeve are between the mandrel and the deceleration shell. The angular contact ball bearing enables the mandrel to rotate relative to the pulser; the coupling is connected with mandrel and the reducer box to maintain the transmission; both the coupling and the coupling sleeve are configured with oil filling holes, then oil is injected into the oil filling holes of the deceleration shell to lubricate the internal parts. The mandrel includes a balanced piston therein, configured to achieve dynamic balance through oil injection.

In an embodiment, the electronic warehouse is fixed with the motor by second bolts. The circuit board frame is in the electronic warehouse and comprises a two-layer circuit board with heat insulation material therein. The circuit board is between gaps of a beam and is fixed by the first bolt.

In other or further embodiments, the inner magnet, the rotating part and the bearing are on the rotating spindle; the rotating part is at least partially inside the inner magnet, and the outer magnet is on the inner magnet and the rotating part. The rotating sleeve is behind the outer magnet by bolts and gaskets, and the driving part has a front cylinder and an end of the rotating sleeve comprises a groove or slot that matches with the front of the driving part. The circuit board controls the motor to move the driving part forward and backward, so that the rotating sleeve, the outer magnet, the inner magnet, the rotating part, the rotating spindle, the reducer box, the mandrel and the rotor rotate. (Thus, the mud flow area changes continuously and regularly, and the downhole signal receiving and transmitting device realizes signal transmission.)

In another or a further embodiment, the centralizer has a rhombus that is uniformly distributed at 90° angles on the circumference to ensure the upright placement of the device. The antenna end covers are on the antenna sleeve, one behind the centralizer, and another at the shoulder of the antenna spindle. The shoulder of the antenna spindle, the antenna end cover and the antenna sleeve have grooves for the antenna. The antenna cover and the antenna end cover have a key groove, receiving a flat key to ensure that the antenna end cover and the antenna sleeve are concentric and do not rotate relative to the spindle. The antenna receives the wireless signal, and transmits the wireless signal to the electronic warehouse for signal processing.

Compared with the existing technology, the present invention has the following beneficial effects: the downhole signal receiving and transmitting device can receive the signal of the lower instrument, which improves the application range of downhole device. The rotating parts are driven step by step and stable. The deceleration part can not only meet the torque demand, but also ensure the high rotation rate, which can ensure the reliable and stable signal output. Besides, the disassembly of the device is improved. The rotary valve system set in the downhole signal receiving and transmitting device is simple in structure, and the shape of the valve port adopts topological structure to improve the quality of downhole pulse signal and the decoding effect of ground information.

BRIEF DESCRIPTION OF THE DRAWINGS

In the attached drawings, the same parts are marked in the same numbers in the attached drawings, which are only used to illustrate the principle of the invention and are not drawn by the actual scale.

The meanings of the marks in the attached drawings are as follows: 1—front end, 2—pulse shell, 3—stator, 4—retention pin, 5—rotor, 6—mandrel, 7—retaining ring, 8—balance piston, 9—pulser, 10—reducer shell, 11—angular contact ball bearing, 12—coupling sleeve, 13—coupling, 14—reducer box, 15—rotating spindle, 16—inner magnet, 17—rotating part, 18—outer magnet, 19—rotating sleeve, 20—drive part, 21—control shell, 22—motor, 23—electronic warehouse, 24—circuit board frame, 25—bolt, 26—conductor A, 27—plug, 28—sealing device, 29—connection sleeve, 30—centralizer, 31—antenna spindle, 32—antenna end cover, 33—antenna, 34—antenna sleeve, 35—battery shell, 36—battery compartment, 37—conductor B, 38—socket.

EXAMPLES

The invention will be further explained in combination with the attached drawings below.

Figure 1:
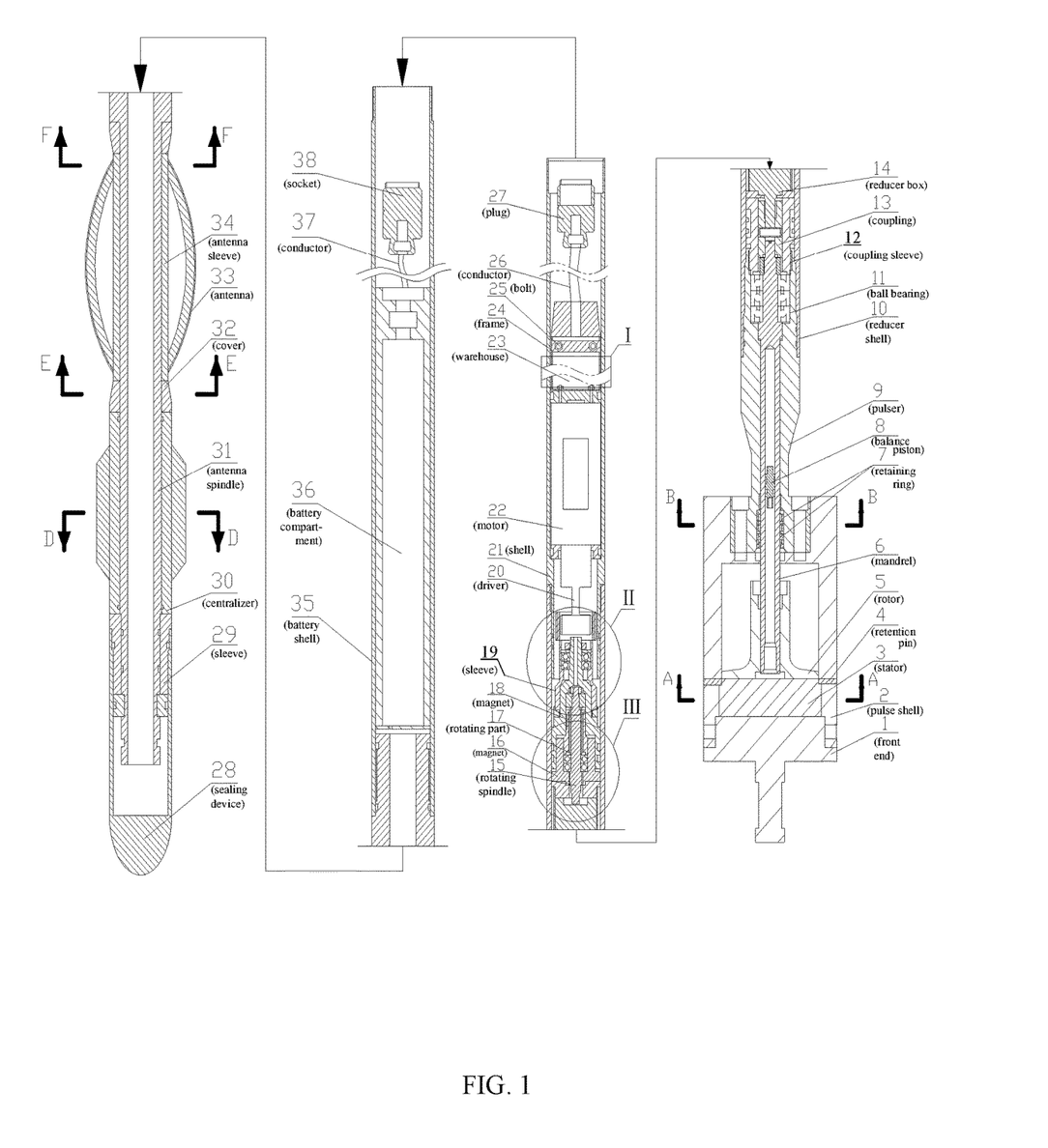
FIG. 1 is a structural diagram of the downhole signal receiving and transmitting device
Figure 2:
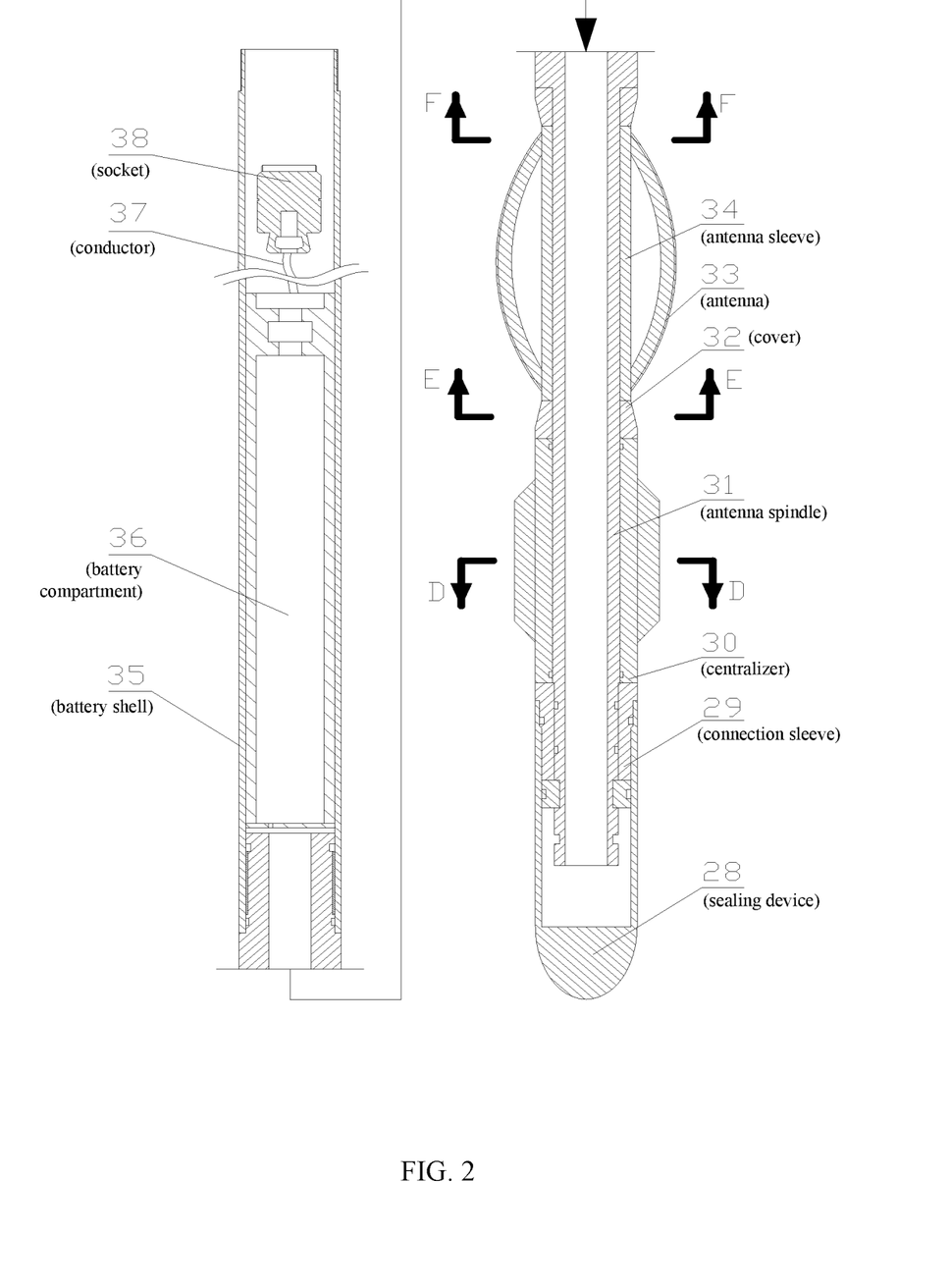
FIG. 2 is a schematic diagram of the receiving device in FIG. 1.

According to an embodiment of the invention FIG. 1 and FIG. 2 schematically shows a downhole signal receiving and transmitting device. The downhole signal receiving and transmitting device is on the outer sleeve, and both ends of the outer sleeve are respectively connected with the upper drilling tool and the lower drilling tool by detachable threads;

As illustrated in FIG. 2, the receiving part comprises a connection sleeve 29 connected with a sealing device 28, a centralizer 30 to ensure the vertical work of the instrument, a receiving antenna 33, an antenna sleeve 34 and an antenna end cover 32 limiting the movement of the receiving antenna 33, an antenna spindle 31, and a battery compartment 36 for the power supply of the whole device, a battery shell 35, a conductor B 37 and a socket 38. The centralizer 30, the antenna sleeve 34 and the connection sleeve 29 are set on the antenna spindle 31. The front end of the antenna spindle 31 is equipped with a sealing device 28. The antenna end cover 32 is on sides of the antenna sleeve 34. The rear end of the battery compartment 36 is installed with a socket 38, both of which are in the battery shell 35 together. The three parts are on the rear end of the spindle. The battery shell 35 is connected to the control shell 21 by a detachable thread. The receiving part can receive the signal transmitted by the lower instrument and supply power to the whole device.

In a preferred embodiment, the control device comprises a plug 27, a conductor A 26, an electronic warehouse 23, a motor 22, a control shell 21 and a driving part 20; the electronic warehouse 23 is fixed with the motor 22 by a detachable thread 25 and is connected with the plug 27 via the conductor A 26. The front cylinder of the drive part 20 is matched with the rear slot of the rotating sleeve 19, and the drive part 20, the motor 22, the electronic warehouse 23 and the plug 27 are in the control shell 21, which is installed to the rear end of the deceleration shell 10. Processing the received signal, the control device controls the rotation of the motor 22 and drives the mechanical assembly.

In a preferred embodiment, the mechanical assembly comprises an outer magnet 18, a rotating sleeve 19, an inner magnet 16, a rotating part 17 and a rotating spindle 15, a reducer box 14, a coupling 13, a coupling sleeve 12, an angular contact ball bearing 11 to ensure that the mandrel 6 can rotate independently and a deceleration shell 10 to assemble the above-mentioned parts; The inner magnet 16 and the rotating part 17 are on the rotating spindle 15, and then all of them are on the rear end of the reducer box 14. The front of the rotating part 17 is located in the inner cavity of the inner magnet 16. The rotating sleeve 19 is connected to the outer magnet 18 by bolts and gaskets. The outer magnet 18 is adsorbed to the inner magnet 16 and the rotating parts 17, and these parts are in the deceleration shell 10 to cooperate with the pulse shell 2. The mechanical assembly can reduce the speed of the motor and transmit the movement to the mandrel 6.

The transmitting mechanism comprises a pulse shell 2, a pulser 9, a balance piston 8 in the cavity of the mandrel 6 to achieve dynamic balance, a rotor 5, a stator 3, a retention pin 4 and a front end 1; The rotor 5 rotates with the mandrel 6 and both of them are in the cavity of the pulse shell 2. The retention pin 4 and the front end 1 restrict the axial movement of the stator 3. The pulser 9 is on the mandrel 6 and matched with the rear end cavity of the pulse shell 2 by bolts. The transmitting mechanism generates a continuous pulse signal due to the change of the flow area of the rotor 5 and stator 3, and emits the measured information to the ground.

Figure 3:
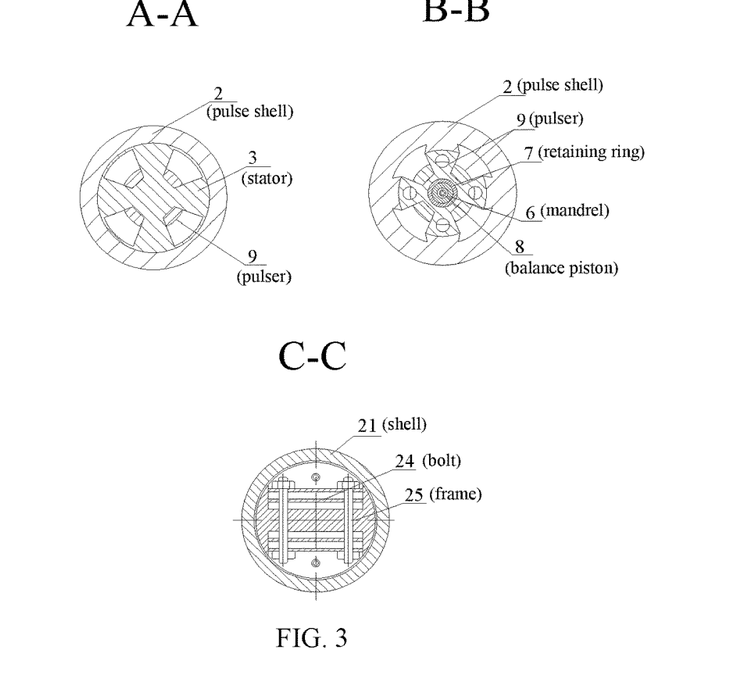
FIG. 3 is a cross-section of the transmitting device in FIG. 1.

In a preferred embodiment, as shown in FIG. 1 and FIG. 3, the circumference of the pulser 9 is uniformly configured with four bolt holes, which are connected to the rear end of the pulse shell 2 by bolts. There is a U-shaped groove between two bolt holes. When the mud passes through the U-shaped groove, the drilling fluid enters the cavity between the pulse shell 2 and the rotor 5. There is a key in the rotor 5 so that the rotor 5 can only rotate 90°.

Further, the angular contact ball bearing 11, the coupling 13, and the coupling sleeve 12 are between the mandrel 6 and the deceleration shell 10. Through the angular contact ball bearing 11, the mandrel 6 can rotate relative to the pulser 9; The coupling 13 is connected to the mandrel 6 and the front of reducer box 14 to maintain the transmission; The coupling 13 and the coupling sleeve 12 are configured with oil filling holes, then oil is injected into the oil filling holes of the deceleration shell 10 to lubricate the internal parts. The inner cavity of the mandrel 6 is configured with a balanced piston 8, which can achieve dynamic balance with oil injection.

Figure 4:
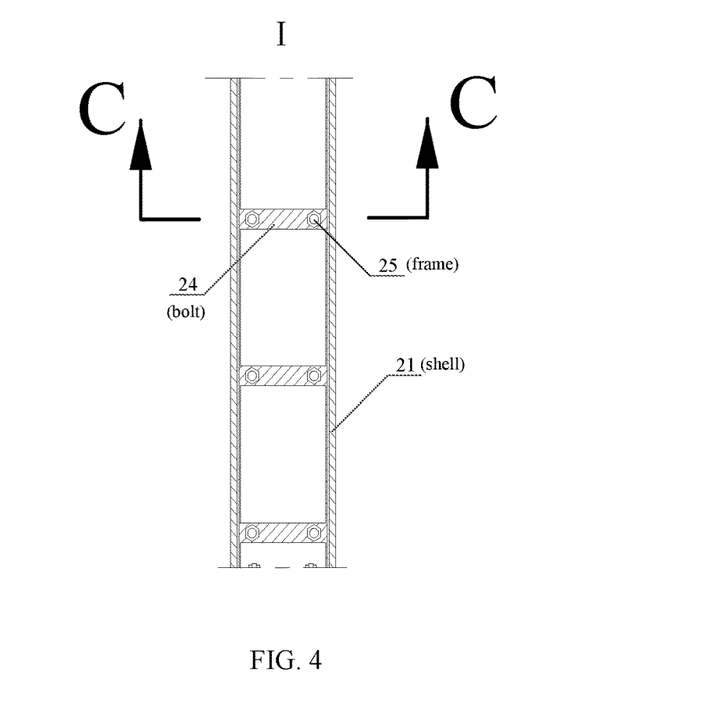
FIG. 4 is a partial enlargement of the transmitting device.
Figure 5:
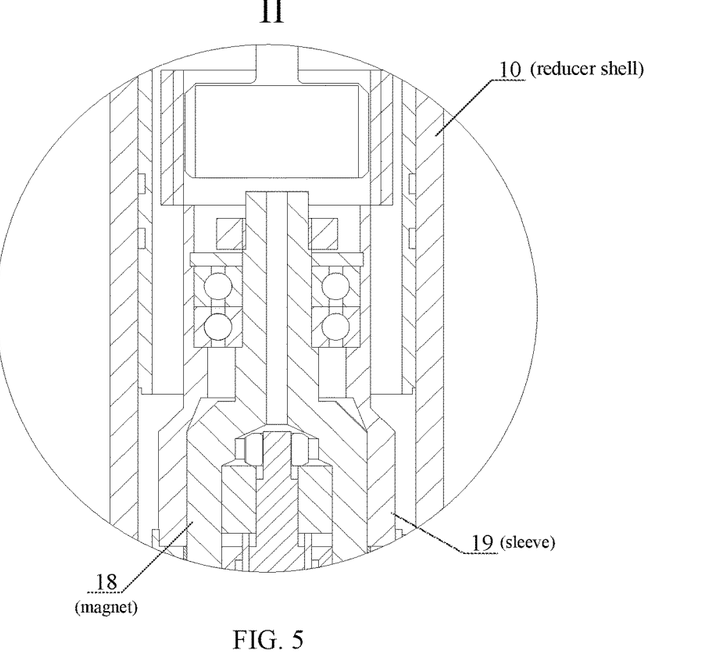
FIG. 5 is a partial enlargement of the transmitting device.
Figure 6:
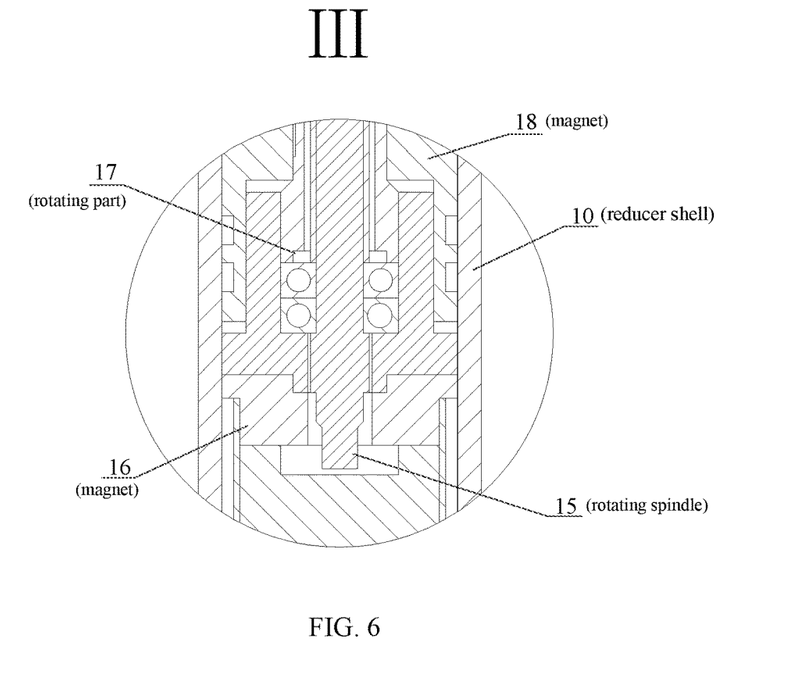
FIG. 6 is a partial enlargement of the transmitting device.

Further, as illustrated in FIG. 2, FIG. 3 and FIG. 4, the electronic warehouse 23 is fixed to the motor 22 by bolts. The circuit board frame 24 in the electronic warehouse 23 has two layers to place circuit boards with the heat insulation material between the two layers. The circuit boards are fixed by the bolts 25 between a gap in the beams.

In a preferred embodiment, as shown in FIG. 5, FIG. 6, FIG. 9 and FIG. 10, the inner magnet 16, the rotating part 17 and the bearing are on the rotating spindle 15; the front of the rotating part 17 is inside the inner magnet 16, and the outer magnet 18 is adsorbed after the inner magnet 16 and the rotating part 17. The rotating sleeve 19 is behind the outer magnet 18 by bolts and gaskets, and the end of rotating sleeve 19 is configured with grooves to match with the front of the driving part 17. The circuit boards of the electronic warehouse 23 control the motor 22 to move the driving part 17 forward and backward so that the rotating sleeve 19, the outer magnet 18, the inner magnet 16, the rotating part 17, the rotating spindle 15, the reducer box 14, the mandrel 6 and the rotor 5 rotate in sequence. Thus, the mud flow area changes continuously and regularly; and the downhole signal receiving and transmitting device realizes signal transmission.

Figure 7:
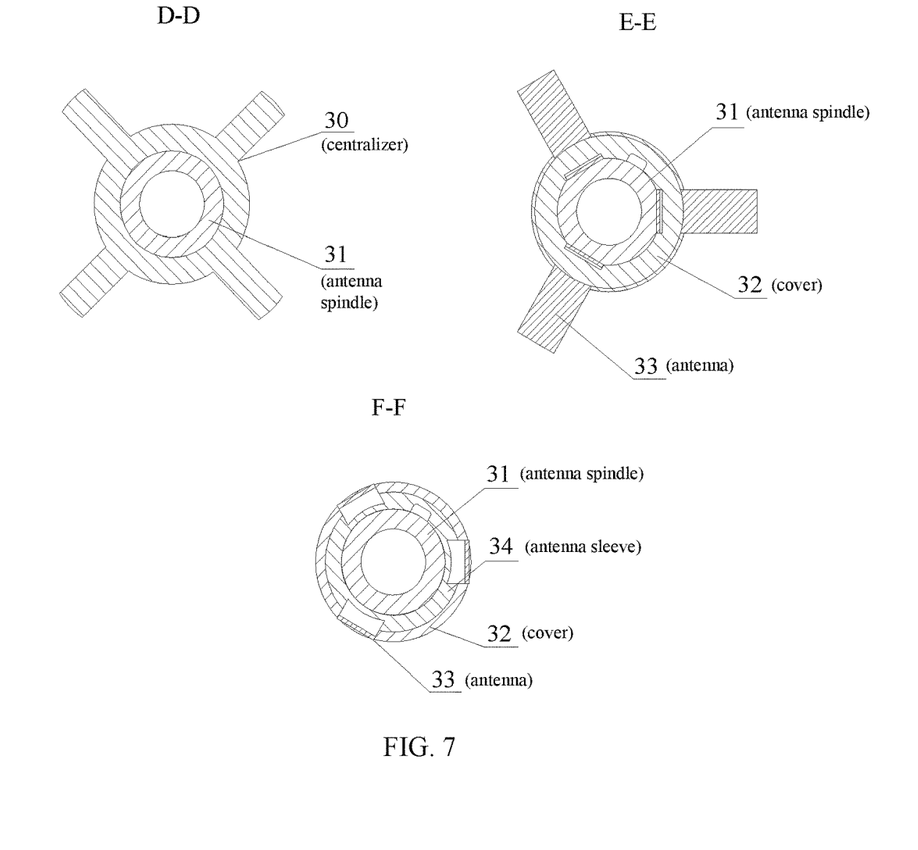
FIG. 7 is a cross-section of the receiving device.
Figure 8:
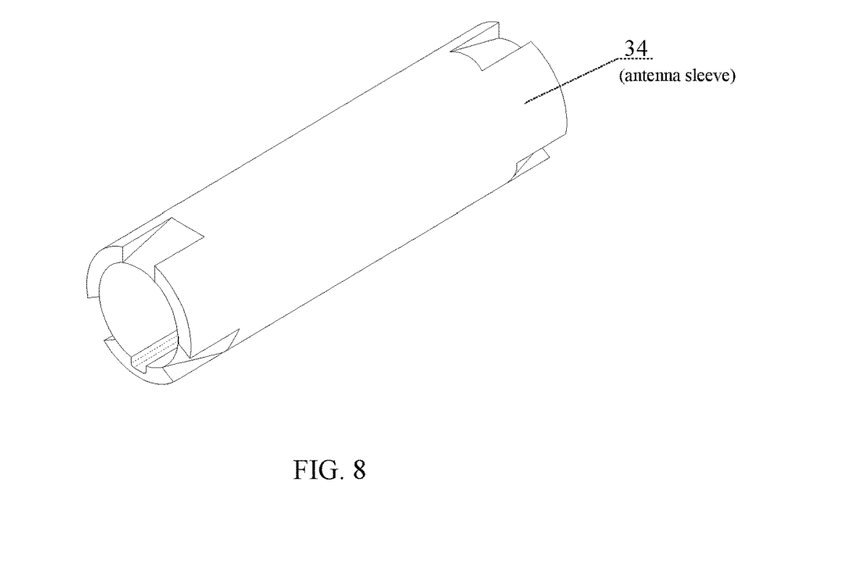
FIG. 8 is a schematic outline diagram of the antenna sleeve.
Figure 9:
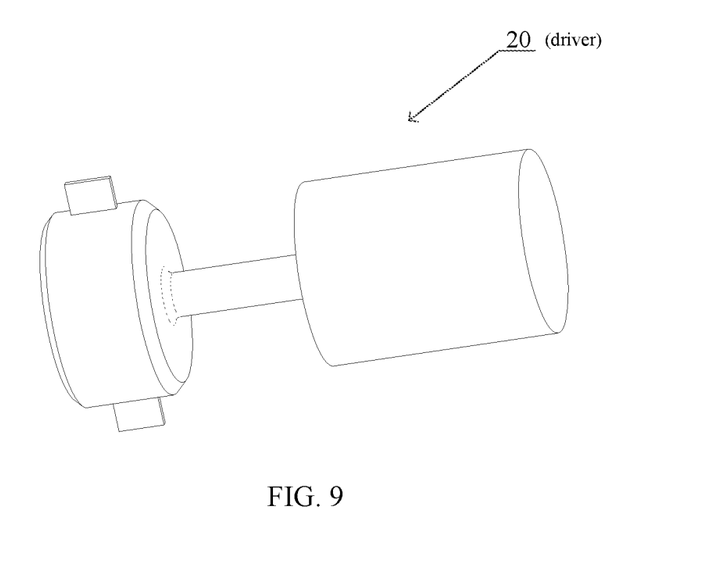
FIG. 9 is a schematic outline diagram of the drive part.
Figure 10:
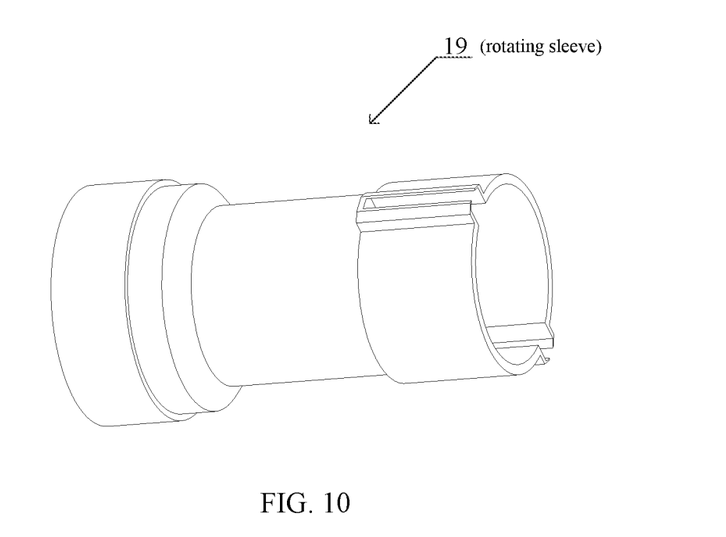
FIG. 10 is a schematic outline diagram of the rotating sleeve.

In a preferred embodiment, as illustrated in FIG. 7 and FIG. 8, the centralizer 30 has a rhombus that is uniformly distributed at 90° angles on the circumference to ensure the upright placement of the device. The antenna end covers 32 are at ends of the antenna sleeve 34; one of the antenna end cover 32 is behind the centralizer 30, the other one is at the shoulder of the antenna spindle 31. Each of the antenna spindle 31, the antenna end cover 32 and the antenna sleeve 34 has grooves for the antenna 33. The antenna sleeve 34 and the antenna end cover 32 have a keyway, receiving a flat key to ensure that the antenna end covers 32 and the antenna sleeve 34 are concentric and do not rotate relative to the antenna spindle 31. The antenna 33 are distributed uniformly at 120° angles on the circumference, receive the signal transmitted by the lower instrument, then transmit to the electronic warehouse 23 for signal processing. The signal receiving of the device is completed.

Finally, it should be noted that the above descriptions are only preferred embodiments of the present invention, and do not constitute any limitation to the present invention. Although the invention has been described in detail with reference to the above-mentioned embodiments, it is still possible to modify the technical solutions recorded in the above-mentioned embodiments or replace some of the technical features equally. Within the spirit and principle of the invention, any modification equivalent to replacement, improvement, etc. should be included in the protection scope of the invention.

What is claimed is:

1. A downhole signal receiving and transmitting device, comprising:
   a mandrel,
   a mechanical assembly that comprises an outer magnet, a rotating sleeve, an inner magnet, a rotating part and a rotating spindle, a reducer box, a coupling connected with the reducer box and the mandrel, a coupling sleeve, an angular contact ball bearing configured to ensure that the mandrel can rotate independently, and a deceleration shell to assemble the outer magnet, the rotating sleeve, the inner magnet, the rotating part and the rotating spindle, the reducer box, the coupling, the coupling sleeve, and the angular contact ball bearing, wherein the mechanical assembly is configured to reduce a rotation speed of a motor, and transmits movement to the mandrel; and
   a transmitting mechanism that comprises a pulse shell, a pulser, a balance piston in the mandrel and configured to achieve dynamic balance, a rotor, a stator, a retention pin and a front end, wherein the transmitting mechanism generates continuous pulse signals due to changes in a flow area of the rotor and the stator, and transmits measured information.

2. The downhole signal receiving and transmitting device as in claim 1, wherein: the pulser has a circumference and four bolt holes evenly distributed at 90° angles on the circumference, the pulser is connected and fixed with the pulse shell by first bolts; the mechanical assembly comprises a U-shaped groove between two of the four bolt holes; when mud passes into or through the U-shaped groove, a drilling fluid enters a cavity between the pulse shell and the rotor; and the rotor includes a key that limits a rotation range of the rotor to 90°.

3. The downhole signal receiving and transmitting device as in claim 1, wherein: the angular contact ball bearing, the coupling, and the coupling sleeve are between the mandrel and the deceleration shell; the angular contact ball bearing enables the mandrel to rotate relative to the pulser; the coupling is connected with the mandrel and the reducer box to maintain transmission; both the coupling and the coupling sleeve have oil injection holes, and oil is injected into oil filling holes of the deceleration shell; and the mandrel includes a balanced piston therein, configured to achieve dynamic balance through oil injection.

4. The downhole signal receiving and transmitting device as in claim 1, wherein: the inner magnet, the rotating part and the bearing are on the rotating spindle; the rotating part is at least partially inside the inner magnet, and the outer magnet is on the inner magnet and the rotating part; the rotating sleeve is behind the outer magnet through bolts and gaskets; and the downhole signal receiving and transmitting device further comprises: a driving part that has a front cylinder, wherein an end of the rotating sleeve comprises a groove or slot that matches with the front cylinder of the driving part; and a circuit board that controls the motor to move the driving part forward and backward, so that the rotating sleeve, the outer magnet, the inner magnet, the rotating part, the rotating spindle, the reducer box, the mandrel and the rotor rotate.

\* \* \* \* \*